UNITED STATES PATENT OFFICE.

ROBERT E. WILSON, OF CAMBRIDGE, MASSACHUSETTS.

PROCESS FOR THE PRODUCTION OF PERMANGANATE.

1,330,032.  Specification of Letters Patent.  Patented Feb. 3, 1920.

No Drawing.   Application filed September 27, 1918. Serial No. 255,976.

*To all whom it may concern:*

Be it known that I, ROBERT E. WILSON, of Mass. Institute of Technology, Cambridge, Massachusetts, have invented a new and useful Improvement in Processes for the Production of Permanganate, of which the following is a specification.

This invention relates to the production of permanganate and has for its object the devising of a process whereby a manganese compound such as sodium manganate may be rapidly and substantially completely oxidized to permanganate. In order to carry the object of my invention into effect I provide a process which contemplates the use of a catalyzer to hasten and complete the formation of permanganate. By my process I have been able to produce purer permanganate, more efficiently and at a lower cost than has hitherto been possible by former methods. In prior processes of this type difficulty has been encountered by reason of the incompleteness of the reaction or the reversion or decomposition of the permanganate formed. When chlorin is the oxidizing agent, further difficulties were occasioned by the presence of hypochlorites and chlorates in the final product of permanganate which was detrimental to the use of the permanganate for certain purposes. All these difficulties I have overcome by my process set forth below, which consists essentially in adding to a manganese compound, such as a manganate, a small amount of an oxid or hydroxid, such as cobalt hydroxid, as catalyzer for the subsequent oxidation. When chlorin is the oxidizing agent used, the catalyzer has the additional function of decomposing the hypochlorite formed in the reaction, thus further aiding the oxidation.

As a specific example of my process, I have described the oxidation of sodium manganate by means of chlorin which consists broadly in forming an alkaline solution of manganate, adding to the same a small amount of cobaltic hydroxid, heating the solution to a moderate degree and then passing in chlorin to oxidize the manganate.

When chlorin is led into an alkaline manganate solution, it reacts with the alkali to form hypochlorite as follows:

(1)  $Cl_2 + 2NaOH = NaCl + H_2O + NaClO$

It has been found that this reaction is very rapid and complete at a temperature above 30° C. If the alkaline carbonate has been used instead of a caustic alkali the reaction is as follows:

(2)  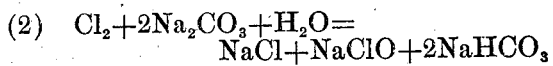
$Cl_2 + 2Na_2CO_3 + H_2O = NaCl + NaClO + 2NaHCO_3$ (3)  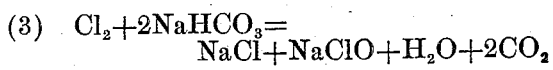
$Cl_2 + 2NaHCO_3 = NaCl + NaClO + H_2O + 2CO_2$ Reaction (2) goes rapidly to completion at a temperature above 35° C., while reaction (3) is less rapid and does not go to completion.

The above reactions take place in the order specificed when an alkaline solution of sodium maganate is chlorinated.

The hypochlorite thus formed reacts to produce the permanganate.

(4)  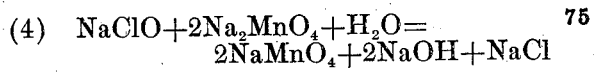
$NaClO + 2Na_2MnO_4 + H_2O = 2NaMnO_4 + 2NaOH + NaCl$

This is probably the mechanism of the oxidation reaction. It is extremely slow in the cold and incomplete in the presence of much excess alkali.

In order to determine how to speed up the reaction and make it more complete, an investigation was conducted to determine the conditions most suitable for the formation of permanganate. The following favorable conditions were determined:

1. Heat. Temperature above 50° C.
2. The presence of cobaltic hydroxid which catalyzed the oxidation of the manganate to a temporary purple color, even in the presence of much excess caustic alkali.
3. Low alkali content.
4. $MnO(OH)_2$, $Fe(OH)_3$ and other metallic oxids and hydroxids which are considerably less efficient catalyzers than $Co(OH)_3$.

Any two of the first three conditions will suffice to make the reaction fairly rapid and complete, and the three together produce an extremely high rate of reaction.

The cobaltic hydroxid catalyzer has a double function. First it breaks up the hypochlorite liberating oxygen, and hastening the oxidation.

(5)  
$2NaClO = 2NaCl + O_2$

This reaction does not go on to any appreciable extent under ordinary conditions. In the presence of cobaltic hydroxid, however, it goes on extremely rapidly, at temperatures about 50° C., and slowly even at 25° to 30°. The presence of other metallic oxids and hydroxids, a low alkali content in the solution, and heat and light also aid the reaction. The nascent oxygen liberated by the decomposition of the hypochlorite serves to promote oxidation of the manganate.

Secondly, in the production of the manganate liquor a large excess of caustic soda is formed which is detrimental to the reaction. To neutralize the alkali and prevent reversion (see below) necessitates the use of a large excess of chlorin beyond that needed for oxidation. The excess hypochlorite thus formed cannot be allowed to remain in the solution, but can be very rapidly and almost completely removed by the addition of a small amount of a cobalt salt which will precipitate cobaltic hydroxid. One tenth of 1% of cobalt nitrate added to the solution will at 50° cause a very rapid evolution of oxygen. The cobalt salt should be added in solution and with stirring to get it in an active form.

If the excess hypochlorite is not quickly decomposed into $O_2$ and NaCl by the use of the catalyzer, it will slowly follow the reaction, (6)  $3NaClO = 2NaCl + NaClO_3$.

This reaction is undesirable chiefly because it results in the formation of chlorates which cannot easily be removed from the solution by evaporation, as can the sodium chlorid. The resultant product is therefore much less pure if reaction (6) be allowed to take place. The above reaction is aided by light, heat and low alkali content or slight acidity, the presence of $MnO_2$ and a high concentration of hypochlorite. The amount of hypochlorite present may be quite accurately controlled by a regulation of the temperature and the amount of catalyzer used.

In prior processes for the production of permanganate much loss was occasioned by the reversion and decomposition of the permanganate formed according to the reaction.

(7)  $4NaMnO_4 + 4NaOH = O_2 + 2H_2O + 4Na_2MnO_4$

This is the reversion reaction which is likely to give trouble when an alkaline solution of a manganate is heated, especially in metal containers. This reversion is encouraged by high alkali content, absence of excess hypochlorite, high temperature, metal surfaces, and suspended manganese dioxid. It may, however, be practically entirely prevented by keeping the alkali content down to 1 or 2%. When the alkali content is much higher than this it is almost impossible to prevent slow reversion. The production of a solution with such a low final alkali content is by far the most important factor in making a solution which can be stored or evaporated without reversion or decomposition.

As a specific example of my process, the following experiment was carried out: A 10% solution of sodium manganate was prepared, and found to contain 20% by weight of sodium hydroxid. One-tenth of 1% of cobalt nitrate in dilute solution was then added and the solution heated to 50° C. Chlorin was led in at a moderately rapid rate. Oxygen was liberated very vigorously. The injection of chlorin was continued until the production of oxygen slowed down, and free chlorin passed through unabsorbed, this denoting the end of the reaction. The chlorin combines with the alkali to form hypochlorite which is immediately attacked by the cobalt hydroxid catalyzer and broken down. The alkali is thus gradually neutralized until toward the end of the reaction the solution contains an amount of alkali less than 30% of the amount of permanganate present. In no case should there be more than 3% of alkali in the solution at the end of the process.

The solution containing principally sodium permanganate and sodium chlorid was then evaporated to crystallize out the sodium chlorid. Permanganate may then be crystallized out or utilized in solution.

In the description of the process above given, the specific example of the conversion of sodium manganate to sodium permanganate by means of chlorin was given. It is to be understood that I do not intend to limit myself to the embodiment set forth, but I desire to include the production of more highly oxidized compounds of manganese from less highly oxidized compounds, broadly except as limited by the appended claims.

I claim:

1. In the process for the production of more highly oxidized manganese compounds from less highly oxidized by means of chlorin in alkaline solution, the step which consists in establishing a low alkali concentration in the solution toward the end of the process.

2. In the process for the production of more highly oxidized manganese compounds from less highly oxidized by means of chlorin in alkaline solution, the step which consists in establishing toward the end of the process alkali concentration of less than 30% of the concentration of permanganate in the solution.

3. In the process for the production of more highly oxidized manganese compounds from less highly oxidized by means of halogen, the step which consists in adding to the reacting mass catalytic material capable of hastening the oxidation.

4. In a process for the production of more highly oxidized manganese compounds from less highly oxidized by means of chlorin, the step which consists in adding to the solution catalytic material capable of hastening the oxidation.

5. In the process for the production of more highly oxidized manganese compounds from less highly oxidized by means of chlorin, the step which consists in adding to the reacting mass catalytic material capable of decomposing hypochlorite.

6. In the process for the production of more highly oxidized manganese compounds from less highly oxidized by means of halogen, the step which consists in adding to the reacting mass metallic oxygen compounds as catalyzer.

7. In a process for the production of more highly oxidized manganese compounds from less highly oxidized by means of chlorin, the step which consists in adding to the reacting mass metallic oxygen compounds as catalyzer.

8. In the process for the production of more highly oxidized manganese compounds from less highly oxidized by means of chlorin, the steps which consist in adding to the reacting mass as catalyzers metallic compounds capable of forming oxids or hydroxids in solution.

9. In the process for the production of more highly oxidized manganese compounds from less highly oxidized by means of chlorin, the step which consists in adding to the reacting mass as a catalyzer oxy compounds of metals of the manganese-iron groups.

10. In the process for the production of more highly oxidized manganese compounds from less highly oxidized by means of halogen, the step which consists in adding to the reacting mass cobalt compounds capable of forming cobalt hydroxid as catalyzer.

11. In a process for the production of more highly oxidized manganese compounds from less highly oxidized by means of chlorin, the step which consists in adding to the reacting mass cobalt compounds capable of forming cobalt hydroxid $Co(OH)_3$ as catalyzer.

12. In the process for the production of more highly oxidized manganese compounds from less highly oxidized by means of halogen, the step which consists in adding to the reacting mass cobaltic hydroxid ($Co(OH)_3$) as catalyzer.

13. In a process for the production of more highly oxidized manganese compounds from less highly oxidized by means of chlorin, the step which consists in adding to the solution cobaltic hydroxid $Co(OH)_3$ as catalyzer.

14. The process for the production of more highly oxidized manganese compounds from less highly oxidized by means of chlorin in alkaline solution which consists in forming an alkaline solution of a manganate and heating the same in the presence of a catalyst, and passing in chlorin until the alkali concentration becomes small.

15. The process for producing permanganate by oxidizing a manganate in the presence of chlorin, which consists in heating an alkaline solution of a manganate to a temperature above 25° in the presence of cobaltic hydroxid, and passing in chlorin until the alkali concentration is less than 30% of the permanganate present.

ROBERT E. WILSON.